United States Patent Office 3,391,085
Patented July 2, 1968

3,391,085
COMPOSITION FOR STRIPPING DURABLE, ADHERENT COATINGS
Joseph T. Crockett, Aberdeen, Md., assignor to the United States of America as represented by the Secretary of the Army
No Drawing. Continuation-in-part of application Ser. No. 318,452, Oct. 23, 1963. This application Oct. 28, 1965, Ser. No. 505,578
4 Claims. (Cl. 252—143)

The invention described herein may be manufactured and used by or for the Government for governmental purposes, without the payment to me of any royalty thereon.

This application is a continuation-in-part of application Ser. No. 318,452, filed Oct. 23, 1963, for Paint Stripper p-Toluenesulfonic Acid Modified, now abandoned.

This invention relaltes to an improved stripping composition which is useful for removing various types of paints and related coatings. More specifically, it relates to a composition which displays substantial stripping action with the more durable, adherent epoxy type coatings that defy similar strippers of the prior art.

Military requirements have prescribed for a single stripping composition which will be effective for loosening dry paint and other finish coatings from nearly all surfaces. In addition to a more universally applicable paint remover, the desired composition should also be quick-acting and capable of penetrating and loosening a coating without scraping or rubbing so that the loosened coating may be washed away in a stream of water. The problem posed by military exigency is to concentrate sufficient softening and penetrating action in a single composition for stripping not only conventional paints, lacquers, enamels, resins, etc., but also the more durable, adherent coatings that are highly resistant to softening action.

In accordance with the above requirements, an improved stripping composition is now provided which has been found to be efficient in loosening various paints and related films from their supporting surface. The essence of the invention is predicated on an improved softening and penetrating action as displayed by the instant composition in a stripping test involving a highly resistant phenolic epoxide coating. The particular phenolic epoxide used in demonstrating the effectiveness of the present composition is a mixture of bisphenol epoxide and phenol-formaldehyde resins, as disclosed in Military Specification MIL–V–12276A, pigmented with aluminum powder and the coating is baked above 400° F. for twenty minutes.

Broadly stated, the present composition comprises a mixture of methylene chloride, formic acid, phenol and p-toluenesulfonic acid which is capable of incorporating and retaining therein a substantial amount of water in a single phase solution. Formic acid is employed in the composition as the principal activator of methylene chloride. A high water content, which is readily obtainable as a result of the present invention, contributes to the softening and penetrating properties of the composition and thus provides for effective disintegration of a more durable, adherent coating.

Although the essential role of water in a methylene chloride and formic acid solution has been appreciated for some time, the water content which could be successfully incorporated by simple mixing to form a single phase solution has been relatively low. Further additions of water separated into liquid phases without contributing any noticeable effects.

Mixtures of methylene chloride, formic acid and water were known to possess stripping action on various paints; however, these mixtures were not found to be successful for removing phenolic epoxide of the type specified in the aforementioned Military Specification. The effectiveness of the present composition which includes both phenol and p-toluenesulfonic acid is very unexpected and substantially greater than for similar compositions that do not contain these ingredients, even when water is included therein at comparable levels.

The combined use of phenol and p-toluenesulfonic acid results in several-fold increase in the water that may be combined and retained therein as a one-phase solution. The water content may be desirably raised to levels of between 10 and 20 percent by weight of the composition. Moreover, the addition of phenol within the limits disclosed herein serves both as an emulsifier for the water and as a solubilizer for the disintegrating coating. The inclusion of p-toluenesulfonic acid enables the water to be dispersed readily by a simple mixing of the ingredients; it is also an active compound of a molecular structure that is capable of easy penetration when carried by a vehicle. The preferred range of p-toluenesulfonic acid in the present composition is about 2–4 percent by weight.

Theoretical aspects of the present composition attribute the rapid penetration and disintegration of a coating to the fact that the disintegration products become hydrogen bonded to the phenol and the bonded products, therefore, become soluble in methylene chloride. The removal of the reaction products by methylene chloride induces a further attack by the formic acid on the remaining coating.

In the following table, Examples 1–7 are illustrative of the present invention and demonstrate their ability to remove a baked, pigmented phenolic epoxide coating. The tests were performed on steel panels which were sprayed with the test phenolic epoxide and then baked at 420° F. for 20 minutes. The coating consists of type III heat-hardenable bisphenol epoxide and phenol-formaldehyde mixture which is pigmented with powdered aluminum, ALCOA #422, at about 22–25 percent by weight of the final mixture. The durability and adherence of this baked coating may be appreciated from the fact that it is intended for use on metal which is deformed or fabricated after it is coated.

| Examples | 1 | 2 | 3 | 4 | 5 | 6 | 7 | 8 | 9 | 10 | 11 |
|---|---|---|---|---|---|---|---|---|---|---|---|
| Ingredients, Weight Percent | | | | | | | | | | | |
| Methylene Chloride | 85.14 | 80.63 | 70.32 | 60.41 | 48.19 | 25.21 | 7.93 | 71.93 | 62.47 | 50.25 | 72.26 |
| Formic Acid | 9.28 | 8.75 | 7.61 | 6.96 | 5.25 | 2.73 | .88 | 7.78 | 7.20 | 5.47 | 7.84 |
| Phenol | 3.23 | 6.62 | 12.68 | 18.70 | 23.18 | 27.30 | 22.94 | 12.97 | 19.34 | 24.17 | 0 |
| Water content | 1.83 | 2.97 | 7.38 | 10.92 | 19.70 | 40.42 | 64.57 | 7.32 | 10.99 | 20.11 | 19.90 |
| p-Toluenesulfonic acid | .52 | 1.03 | 2.01 | 3.01 | 3.68 | 4.34 | 3.68 | 0 | 0 | 0 | 0 |
| Percent paint removed | 5 | 66 | 90 | 100 | 100 | 60 | None | None | None | None | None |

The percent of paint removed was determined from the amount of paint blistered from a 25 mm. circle on a panel coated at 1 mil thickness with the aluminum-pigmented phenolic epoxide which was baked at a temperature over 400° F. for 20 minutes.

As standards of comparison, Examples 8–11 demonstrate the ineffectiveness of similar compositions in which water was added in sufficient amounts for test purposes. In the absence of p-toluenesulfonic acid, these compositions were found to be ineffective against the test coating.

Examination of the data in the table indicates that Examples 4 and 5 are the most effective compositions in accordance with the invention; Examples 2, 3 and 6 indicate the range of effectiveness. In Example 1, the .52% p-toluenesulfonic acid, while not really effective, has begun to show signs of stripping activity. Even though there is a high enough concentration of p-toluenesulfonic acid in Example 7, there is an insufficient vehicle present to carry it through the surface of the coating.

An effective range of ingredients by weight percent is as follows:

| Ingredient | Percentage |
|---|---|
| Methylene chloride | 40–71 |
| Formic acid | 2–8 |
| Water content | 3–20 |
| Phenol | 12–30 |
| p-Toluenesulfonic acid | 1–5 |

Since the stripping composition is acidic, it is advisable not to apply it to coated, basic metallic surfaces and it is preferable to include an inhibitor in the composition when applying it to ferrous metals. Aluminum is not affected by this stripper. Investigation has shown that corrosion to ferrous metals resulting from contact or immersion in the present composition can be prevented by adding a 37% solution of formaldehyde (formalin) in about 1% by volume of said composition.

The time necessary for complete removal of the test coating and other coatings which are very difficult to strip is about 25 to 35 minutes of immersion time. Complete removal of an Epon Resin, Bisphenol A type cured with ethylenediamine and baked for 20 minutes at 300° F. requires about 4½-12 minutes of immersion time.

It is therefore apparent that this invention provides an improved composition which has been found effective for stripping the more durable, adherent coatings, such as the baked epoxides which resist the hereto known removers.

It is to be understood that the invention has been described and certain specific examples have been given by way of illustration but no limitation is intended thereby, the spirit and scope of the invention being limited only by the terms of the appended claims.

What is claimed is:

1. A stripping composition consisting essentially of the following ingredients in the proportions by weight specified:

| Ingredients | Percentage by weight |
|---|---|
| Methylene chloride | 40–71 |
| Formic acid | 2–8 |
| Phenol | 12–30 |
| Water | 3–20 |
| p-Toluenesulfonic acid | 1–5 |

2. A stripping composition in accordance with claim 1 in which water is present in an amount in the range of about 10 to 20 percent by weight.

3. A stripping composition in accordance with claim 1 in which p-toluenesulfonic acid is present in an amount in the range of about 2 to 4 percent by weight.

4. A stripping composition in accordance with claim 1 which includes formalin as a corosion inhibitor in about 1% by volume of said composition.

References Cited
UNITED STATES PATENTS

| | | | |
|---|---|---|---|
| 1,470,225 | 10/1923 | Holmes | 252—146 |
| 2,083,013 | 6/1937 | Freeman | 252—143 X |
| 2,507,984 | 5/1950 | Kuentzel | 252—143 |
| 3,072,579 | 1/1963 | Newman | 252—143 |
| 3,075,923 | 1/1963 | Berst et al. | 252—143 X |

LEON D. ROSDOL, *Primary Examiner.*

W. E. SCHULZ, *Assistant Examiner.*